United States Patent
McKibben et al.

[15] 3,671,018
[45] June 20, 1972

[54] BUBBLE-BLENDING PARTICULATE SOLIDS

[72] Inventors: Charles W. McKibben, Grove, Okla.; Robert C. Robinson, La Marque, Tex.

[73] Assignee: Union Carbide Corporation, New York, N.Y.

[22] Filed: Nov. 19, 1970

[21] Appl. No.: 91,030

[52] U.S. Cl. ............................................259/4, 259/DIG. 17
[51] Int. Cl. .............................................................B01f 13/02
[58] Field of Search....................259/4, DIG. 17, 18, 36

[56] References Cited

UNITED STATES PATENTS 2,292,897  8/1942  Nielsen............................259/DIG 17
2,723,838  11/1955  Peters...................................259/4

Primary Examiner—Robert W. Jenkins
Attorney—Paul A. Rose, Aldo John Cozzi and Bernard Francis Crowe

[57] ABSTRACT

Particulate solids such as normally solid polymer particles can be blended to achieve complete homogeneity in a storage vessel containing a volume up to about 10,000 cubic feet of resin by rapidly introducing gas bubbles at the base of the vessel. The gas is introduced through nozzles protruding from a plenum located at the bottom of the vessel with the nozzle orifices located parallel to the vessel walls adjacent to the plenum.

11 Claims, 3 Drawing Figures

PATENTED JUN 20 1972 3,671,018

INVENTORS
Charles W. McKibben
Robert C. Robinson
BY Bernard F. Crowe
ATTORNEY

BUBBLE-BLENDING PARTICULATE SOLIDS

BACKGROUND OF THE INVENTION

This invention relates to the blending of particulate solids and in particular to a method for converting a heterogeneous mixture of normally solid polymer particles to a homogeneous mixture.

The blending of particulate solids and vinyl resins specifically has been accomplished in the past in a variety of ways. Mechanical mixers of several types such as tumbling mixers, ribbon blenders, and high shear mixers have been used as well as, intermittently fluidizing the entire bed of resin, agitating the bed with high-speed spiral air jets, pneumatic pulsation, and like methods. While all of these methods can be used they are expensive in that they require a high initial investment in equipment. With ever narrowing profit margins in the polymer industry it becomes more desirable if not essential that processing cost be kept to a minimum. The ideal process for blending particulate resins which are heterogeneous in such properties as chemical composition, molecular weight, color, particle size, number of fisheyes, and the like, is one which can be used with existing storage vessels, requires a reasonably short blending time, provides a thoroughly homogeneous blend and is low in cost.

SUMMARY OF THE INVENTION

A method of converting a heterogeneous mixture of normally solid polymer particles, ranging in size from about 25 to about 500 microns in diameter with a density of about 10–50 lbs./ft.$^3$, to a homogeneous mixture within 95 percent statistical confidence limits has now been found which comprises the steps of:

a. containing said particles in a blending device comprising:
  1. a vertically oriented storage vessel, having an opening in the bottom;
  2. a plenum centrally located at the bottom of said vessel arranged in registering relationship with the opening of said vessel;
  3. means for selectively closing the opening in said vessel;
  4. a source of pressurized gas communicating with said plenum;
  5. about 6 to about 26 nozzles having an internal diameter of about one-eighth inch to about one-half inch protruding from said plenum in communication with said pressured gas with from about 6 to 24 nozzles having their orifices oriented in an attitude parallel to those lower surfaces of said vessel adjacent to said plenum and with from 0 to about 2 nozzles having their orifices oriented in an attitude parallel to the central axis of said vertically oriented storage vessel; and
  6. pressure means between said plenum and said source of pressurized gas which controls the velocity of gas passing through said nozzles in a continuous flow within a range of velocities sufficient to introduce gas bubbles into the mixture of solid particles in a random distribution, and b. passing gas from said gas source at ambient temperatures through the plenum nozzles at a velocity sufficient to cause bubbles of gas to rise through the mass of heterogeneous particles and to emerge from the top surface of said particles, until a homogeneous blend of said particles is obtained.

IN THE DRAWINGS

Figure 1:
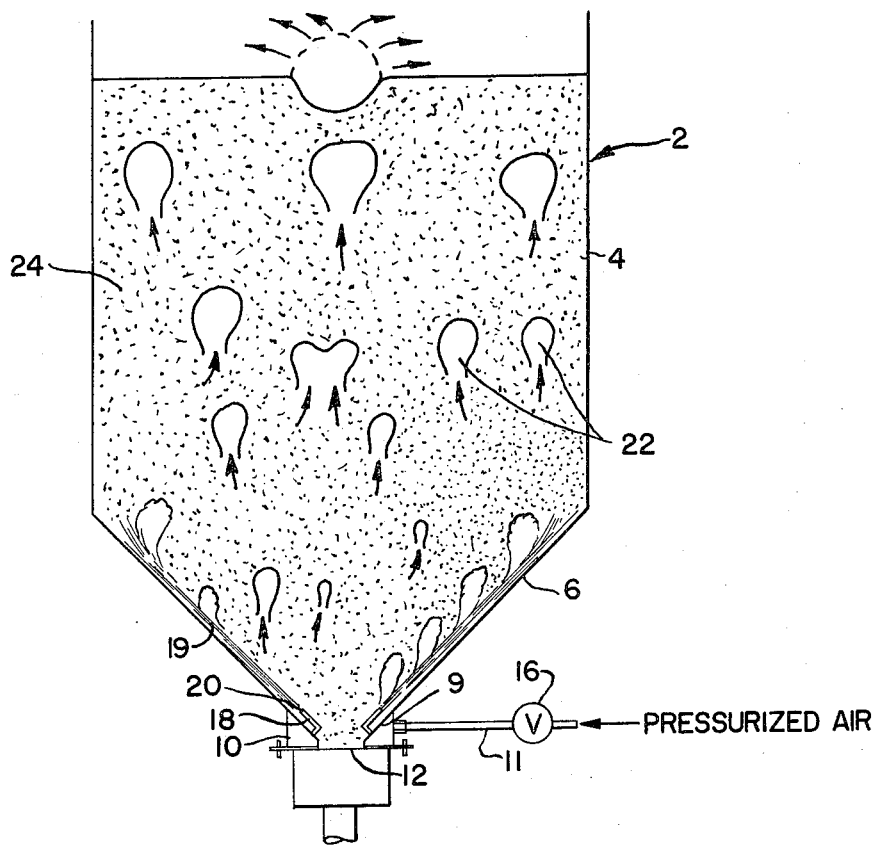
FIG. 1 is a vertical elevation of a storage vessel for resin particles with a gas dispersing plenum fitted through an opening in the conical bottom of the vessel.

Referring now to the drawings in detail, a suitable apparatus for the practice of this invention is provided by a blending device such as that shown in FIG. 1.

Such apparatus comprises, firstly, a storage vessel 2 consisting of an upper cylindrical section 4 mounted above and connected to a truncated conical section 6 having an opening 8 and secondly, a plenum 10 having in this concept the form of a hollow collar whose inside walls 9 are angled to permit its installation in registering relationship with the vessel opening 8 allowing particles stored in storage vessel 2 to pass through the opening 12 in plenum 10 when take-off means 13 is opened. Pressurized air or any gas under pressure enters plenum 10 through gas inlet tube 11 from a pressure regulating means 16 and thence through nozzles 18 most of whose orifices 20 are positioned so that the gas enters vessel 2 parallel to the sides of conical section 6 in streams 19 from which eddy currents break off causing bubbles 22 of gas to rise at random points in the bed of particulate matter 24 contained in vessel 2.

Figure 2:
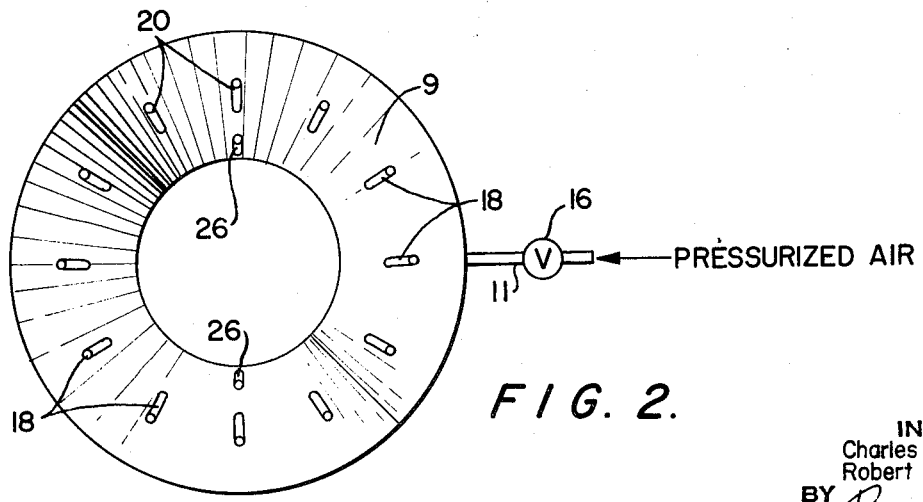
FIG. 2 is a plan view of a plenum containing gas nozzles and a gas inlet tube.

FIG. 2 shows a symmetrical arrangement of the nozzles 18 which are positioned in such a manner that their orifices 20 allow the gas streams 19 to pass into the vessel 2 parallel to the walls of conical section 6. FIG. 2 also depicts two additional nozzles 26 which are used for large volume storage vessels holding more than about 20 cubic feet of particulate matter. Nozzles 26 are positioned to eject gas streams vertically, that is, parallel to the central axis of vessel 2 in order to insure random blending of the particulate matter 24 therein. The optimum arrangement and number of nozzles will be determined by the size and shape of each particular blending vessel. Thus the smaller the periphery of the vessel the fewer the number of nozzles required. However, the volumes of the vessels commonly used in the industry are of such a magnitude that a plenum having a plurality of nozzles will usually be required. While the location of these nozzles is not narrowly critical it is preferred that they be equidistant from one another in a symmetrical arrangement. When the plenum is circular as in FIG. 2 and the lower section of the storage vessel is conical, it is preferred to have the nozzles spaced at intervals of about 15° to about 60° around the inner circumference of the cone.

The internal diameter of the orifices 20 of nozzles 18 and 26 is critical and must be in the range of one-eighth to one-half inch. Nozzles having orifices outside these dimensions do not afford the blending results of this invention.

While the length of the nozzles is not critical it is preferred that the nozzles be in the range of about ½ inch to 4 inches in length. An even more preferred range for this dimension is about ½ to 1 inches.

Figure 3:
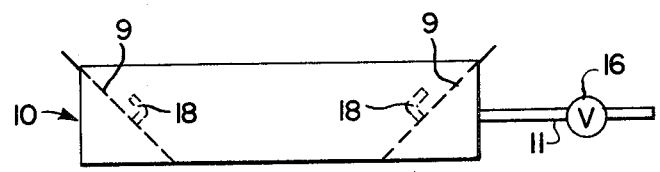
FIG. 3 is a vertical elevation of the plenum shown in FIG. 2.

FIG. 3 is a vertical elevation of plenum 10 showing internal walls 9 angled to approximate the slant of the conical section 6, nozzles 18, gas inlet tube 11 and pressure regulating means 16.

DESCRIPTION OF THE INVENTION

The dimensions and geometry of both the storage vessel and the plenum are not critical as long as a relationship is achieved wherein the majority of the orifices of the nozzles protruding from the plenum are positioned parallel to the lower surfaces of the storage vessel. However, it is preferred that the storage vessel be constructed in such a manner that the upper body is cylindrical in shape superimposed or resting on a lower section consisting of a cone with the vertex section constituting the lower most section of the vessel. It is even more preferred to employ a cone which is truncated near the vertex. this permits the installation of the take-off means at the bottom of the vessel where the vertex would be below the truncation. The plenum then is preferably located just above the vessel take-off means with the majority of the nozzle orifices located parallel to the cone surfaces. In the case of small vessels, that is, containing a volume no more than about 20 cubic feet, all of the orifices can be positioned in this manner. However, for large vessels in the range of about 20 to 10,000 cubic feet, it is advisable to have one or two orifices pointed directly upward, that is, parallel to the central axis of the vessel.

The geometry or physical form and shape of the plenum is not at all critical since its function and purpose is to provide (1) a means for supporting the gas nozzles in the desired position within the storage vessel and (2) a means for bringing pressured gas to and through the orifice nozzles. Thus it can be readily seen that the plenum can be any hollow enclosure or channel such as a collar whose cross section can be circular, eliptical, rectangular, square, triangular or any other shape.

Blending of the particles in the storage vessel is effected as bubbles of gas form from the gas streams emerging from the orifices and rise to the surface of the particle bed in wide sweeping zig-zag motions. Once a bubble is formed, adjacent particles flow around its upper portion and down to its lower cavity, forcing the bubble upward. Particles lying directly above the bubble are forced upward as others are pushed aside, some of which flow down into the lower portion of the bubble, filling its path. Thus, a rising bubble spreads particles radially in all directions. As a given bubble rises, particles filling its bottom cavity are packed slightly tighter than the particles immediately outside the bubble's path. The next bubble rising in that area will follow a path through the less tightly packed particles just to the side of the first bubble's path. Thus, each bubble will tend to rise in a different location, blending new areas of particles in with the old areas of particles. As more and more bubbles rise through the particle bed, small adjacent bubbles join together forming larger ones. This action, along with the bubbles flowing toward low pressure areas, causes a wide sweeping zig-zag bubble motion creating horizontal as well as vertical blending. Bubbles burst through the top surface of the particle bed scattering particles over the void space in the vessel. Thus, the compressed gas escapes from the particle bed in puffs rather than a continuous flow as it does when it enters. These intermittent puffs of gas allow particles that would be entrained in the gas flow an opportunity to fall back to the particle bed surface rather than being swept out the gas exiting vent.

It is to be emphasized that in the claimed invention there is no mass movement of the particle bed as there is in a fluidized bed technique.

Blending time is not narrowly critical with the minimum time required for complete blending being dependent upon the volume of particles thus treated. Thus, it has been found that for vessels having a volume of about 3,000 cubic feet, about 15 minutes is sufficient time to effect complete mixing. Since the time required for obtaining a uniform blend is directly proportional to the volume being blended, smaller vessels will require times less than 15 minutes. There are no upper time limits for blending operation inasmuch as the blending device described herein will not reverse the blending process or cause the homogeneous blend obtained to revert to a heterogeneous blend.

Temperature is not a critical factor in the blending method disclosed herein other than for those limitations such as the decomposition point, softening point or melting point of the particulate matter being blended. For convenience, ambient temperatures are preferred.

The type of gas useful on the practice of this invention is not critical. Inert, non-toxic gases are preferred with air being most preferred because of economic considerations.

As to the pressure of the gas used, the only criticality is that it be sufficient to force bubbles through the solid particles reaching all areas to be blended.

The velocity of the gas passing through the nozzle orifices should be sufficient to form bubbles randomly over the entire cross section of the vessel. The required gas velocities can be determined by visual inspection of the particle mass during blending and are readily achieved and controlled by pressure means well known in the art. No absolute values can be given without specifying the shape and size of the blending vessel and the density and bed height of the solid particles in the blending vessel nor are such needed to practice the invention since one can easily provide a satisfactory gas velocity without measuring it. The gas velocities used are generally greater than those required for fluidization of particulate matter. This aspect of the invention may be further distinguished from fluidization techniques in that the latter requires an even dispersion of incoming gas entry ports over the entire cross section of the vessel. In contrast the present invention employs nozzles located chiefly around the periphery of the bottom vertex of the vessel.

Additional advantages which accrue through the use of the blending device described herein include freedom from contamination of the material being blended since there are no moving parts which are often accompanied by frictional burning or lubricant seepage. It may also be pointed out that the blending device facilitates emptying the storage vessel by loosening packed masses of particles and that the blending device does not hamper cleaning of the vessels since in occupies only a small space at the bottom thereof.

While there are no limitations as to the chemical nature of the particulate matter which can be used with the blending device described hereinbefore, there are the physical limitations of particle size and density. Efficiency falls off rapidly if one exceeds the bounds of about 25 to about 500 microns for particle diameter and about 10 to about 50 pounds per cubic foot for particle density. Particles exceeding the upper limits become less amenable to bubble formation and random movement necessary for blending while particles falling below the lower limits are prone to fluidization which again does not provide random movement.

The invention is further described in the examples which follow. All parts and percentages are by weight unless otherwise specified.

EXAMPLE 1

A storage bin consisting of a 45° truncated cone integrally connected to a cylindrical upper section 10 feet in diameter and 20 feet high, that is, on the vertical side, was fitted with a plenum such as depicted in FIGS. 2 and 3. By mounting the plenum at the truncated area a blending device was provided, such as shown in FIG. 1. Approximately 50,000 lbs. of "flushings" (small quantities of assorted suspension polyvinyl chloride homopolymer and vinyl chlorides/vinyl acetate copolymer) was transferred into the bin. Samples taken as the reson was being transferred into the bin showed polyvinyl chloride contents ranging from 94.8 percent to 99.8 percent and ASTM inherent viscosities ranging from 0.604 to 0.991. Air was passed into the bin through the nozzles of the plenum at a rate of about 25,000 cubic feet per hour for a period of about 30 minutes. After this time samples were withdrawn at a point 15 feet deep in the bin and at a point 20 feet deep in the bin and analyzed as shown in the table below.

TABLE 1

| Sample | Inherent Viscosity | % Poly Vinyl Chloride | Screen Analysis | | |
|---|---|---|---|---|---|
| | | | % on 40 mesh | % on 100 mesh | % thru 200 mesh |
| 15' deep | 0.81 | 97.2 | 0 | 15.1 | 20.8 |
| 20' deep | 0.83 | 97.4 | 0 | 15.4 | 18.8 |

The blended resin was then withdrawn from the bin with 10 samples taken at random during this complete withdrawal. The results of analysis for these 10 examples is shown in the table below.

TABLE 2

| Sample | Inherent Viscosity | % on 40 mesh | % on 100 mesh | Screen Analysis % thru 200 mesh |
|---|---|---|---|---|

| | | | | |
|---|---|---|---|---|
| 1 | 0.81 | 0 | 19.0 | 18.9 |
| 2 | 0.83 | 0 | 16.0 | 18.6 |
| 3 | 0.82 | 0 | 17.3 | 16.1 |
| 4 | 0.82 | 0 | 16.1 | 19.8 |
| 5 | 0.82 | 0 | 16.6 | 18.6 |
| 6 | 0.81 | 0 | 16.6 | 18.3 |
| 7 | 0.81 | 0 | 17.4 | 17.8 |
| 8 | 0.81 | 0 | 17.0 | 19.2 |
| 9 | 0.80 | 0 | 18.0 | 18.3 |
| 10 | 0.83 | 0 | 16.2 | 17.4 |

The analytical determinations were within 95 percent statistical confidence limits and the blend was therefore judged to be homogeneous.

EXAMPLE 2

Using the same equipment described in Example 1 the bin was charged with approximately 50,000 pounds of assorted polyvinyl chloride resin. The inherent viscosity (ASTM D-1243 method A) of the resins ranged from 0.70 to 1.10. The resin mixture was blended for 30 minutes with the flow rate of 25,000 cubic feet per hour of air. Samples were then taken at varying depths in the resin bed having the analyses shown in Table 3 below.

TABLE 3

| Sample Depth from Top in Feet | Inherent Viscosity | Screen Analysis | | |
|---|---|---|---|---|
| | | % on 60 mesh | % on 100 mesh | % thru 200 mesh |
| 7 | 0.80 | 0.2 | 23.7 | 2.0 |
| 8 | 0.81 | 0.3 | 22.6 | 2.0 |
| 12 | 0.82 | 0.1 | 20.6 | 2.2 |
| 16 | 0.82 | 0.1 | 20.5 | 2.1 |
| 19 | 0.81 | 0.2 | 20.1 | — |

The consistent results in inherent viscosity and particle size indicated a homogeneous blend was achieved.

EXAMPLE 3

Using the equipment disclosed in Example 1 the bin was charged with approximately 50,000 pounds of assorted polyvinyl chloride polymers having inherent viscosities ranging from 0.50 to 0.95 and medium particle sizes from 90 to 130 microns. The resin was blended for 1 hour using 25,000 cubic feet per hour of air. Samples were then taken at various points in the bed as shown in Table 4 below.

TABLE 4

| Sample depth from Top of bin, in feet | Inherent Viscosity | Screen Analysis | | |
|---|---|---|---|---|
| | | % on 60 mesh | % on 100 mesh | % thru 200 mesh |
| 8 | 0.61 | 1.1 | 12.3 | 16.9 |
| 12 | 0.62 | 1.2 | 11.5 | 17.5 |
| 15 | 0.62 | 1.0 | 11.9 | 16.9 |
| 18 | 0.62 | 0.9 | 11.0 | 17.4 |
| 21 | 0.62 | 0.9 | 12.0 | 16.4 |

Analyses were well within the 95 percent statistical confidence limits and therefore the above charge was judged to be thoroughly blended.

EXAMPLE 4

Using the equipment described in Example 1 the bin was charged with assorted polyvinyl chloride homopolymers and vinyl chloride/vinyl acetate copolymer resins, the total amounting to approximately 50,000 pounds. The resin was blended for 30 minutes using 28,000 cubic feet per hour of air. Samples were withdrawn at various points in the bin and the results are shown in Table 5 below.

TABLE 5

| Sample depth from Top in Feet | Inherent Viscosity | % Polyvinyl Chloride | Screen Analysis | | |
|---|---|---|---|---|---|
| | | | % on 60 mesh | % on 100 mesh | % thru 200 mesh |
| 9 | 0.95 | 99.1 | 1.6 | 22.5 | 2.8 |
| 12 | 0.94 | 99.1 | 1.5 | 25.0 | 2.6 |
| 15 | 0.94 | 99.1 | 1.8 | 25.5 | 2.9 |
| 19 | 0.94 | 99.1 | 1.8 | 23.5 | 2.9 |
| 22 | 0.93 | 99.1 | 1.3 | 20.3 | 3.1 |

All analyses were within 95 percent statistical confidence limits and the resin was judged to be a homogeneous blend.

EXAMPLE 5

The equipment described in Example 1 was used with the exception that a heat exchanger was inserted in the air supply line to warm the air. The bin was charged with approximately 50,000 pounds of assorted polyvinyl chloride resins. The charged resin was quite wet with the total volatiles being 15–20 percent. The resin was blended for 40 hours using 25,000 cubic feet per hour at 25° C. The resin bed was then sampled at three depths and analyzed as shown in Table 6 below.

TABLE 6

| Sample Depth From Top in Feet | Inherent Viscosity | % Volatiles | Screen Analysis | | |
|---|---|---|---|---|---|
| | | | % on 60 mesh | % on 100 mesh | % thru 200 mesh |
| 1.3 | 0.89 | 2.1 | 0.6 | 27.3 | 6.5 |
| 19.0 | 0.87 | 2.3 | 0.6 | 27.8 | 7.8 |
| 22.5 | 0.86 | 2.4 | 0.5 | 26.5 | 8.3 |

The homogeneity of the resin was proved by the fact that all analyses are within the 95 percent statistical confidence limits. In addition the resin was dried from 15–20 percent volatiles to about 2.3 percent volatiles.

Although the invention has been described in its preferred form with a certain degree of particularity, it is understood that the present disclosure has been made only by way of example, and that numerous changes can be made without departing from the spirit and the scope of the invention.

What is claimed is:

1. A blending device suitable for converting a heterogeneous mixture of solid particles ranging in size from about 25 to about 500 microns in diameter and having a density of about 10 to about 50 pounds per cubic foot to a homogeneous mixture which comprises:
   1. a vertically oriented storage vessel, having an opening in the bottom;
   2. a plenum centrally located at the bottom of said vessel arranged in registering relationship with the opening of said vessel;
   3. means for selectively closing the opening in said vessel;
   4. a source of pressurized gas communicating with said plenum;
   5. about 6 to about 26 nozzles having an internal diameter of about one-eighth inch to about one-half inch protruding from said plenum in communication with said pressured gas with from about 6 to 24 nozzles having their orifices oriented in an attitude parallel to those lower surfaces of said vessel adjacent to said plenum and with from 0 to about 2 nozzles having their orifices oriented in an attitude parallel to the central axis of said vertically oriented storage vessel; and
   6. pressure means between said plenum and said source of pressurized gas which controls the velocity of gas passing through said nozzles in a continuous flow within a range of velocities sufficient to introduce gas bubbles into the mixture of solid particles in a random distribution.

2. Device claimed in claim 1 wherein the storage vessel consists of a cylinder as the upper section super-imposed on a truncated cone serving as the lower section.

3. Device claimed in claim 2 wherein the cone is truncated in the vicinity of the vertex.

4. Device claimed in claim 2 wherein the nozzles are about ½ inch to 4 inches in length.

5. Device claimed in claim 2 wherein the nozzles are spaced at intervals of about 15° to 60° around the inner circumference of the truncated cone.

6. Method of converting a heterogeneous mixture of normally solid particles ranging in size from about 25 to 500 microns in diameter and having a density of about 10 to 50 pounds per cubic foot to a homogeneous mixture which comprises the steps of:
   a. containing said particles in a blending device comprising:
      1. a vertically oriented storage vessel, having an opening in the bottom;
      2. a plenum centrally located at the bottom of said vessel arranged in registering relationship with the opening of said vessel;
      3. means for selectively closing the opening in said vessel;
      4. a source of pressurized gas communicating with said plenum;
      5. about 6 to about 26 nozzles having an internal diameter of about one-eighth inch to about one-half inch protruding from said plenum in communication with said pressurized gas with from about 6 to 24 nozzles having their orifices oriented in an attitude parallel to those lower surfaces of said vessel adjacent to said plenum and with from 0 to about 2 nozzles having their orifices oriented in an attitude parallel to the central axis of said vertically oriented storage vessel; and
      6. pressure means between said plenum and said source of pressurized gas which controls the velocity of gas passing through said nozzles in a continuous flow within a range of velocities sufficient to introduce gas bubbles into the mixture of solid particles in a random distribution, and
   b. passing gas from said gas source at ambient temperatures through the plenum nozzles at a velocity sufficient to cause bubbles of gas to rise through the mass of heterogeneous particles and to emerge from the top surface of said particles, until a homogeneous blend of said particles is obtained.

7. Method claimed in claim 6 wherein the storage vessel consists of a cylinder as the upper section super-imposed upon a truncated cone serving as the lower section.

8. Method claimed in claim 6 wherein the nozzles are about ½ inch to 4 inches in length.

9. Method claimed in claim 6 wherein the nozzles are spaced at intervals of about 15° to 60° around the inner circumference of the truncated cone.

10. Method claimed in claim 6 wherein the nozzles are symmetrically located on the plenum equidistant from one another.

11. Method claimed in claim 6 wherein the gas is air.

* * * * *